United States Patent
Olsen et al.

(10) Patent No.: US 6,932,613 B2
(45) Date of Patent: Aug. 23, 2005

(54) PRE-WRITING TEACHING AID AND METHOD TO ASSIST BEGINNING WRITERS IN CREATING LETTERS

(75) Inventors: Janice Z. Olsen, Bethesda, MD (US); Emily Knapton, Omaha, NE (US)

(73) Assignee: Handwriting Without Tears, Inc., Cabin John, MD (US)

(*) Notice: Subject to any disclaimer, the term of this patent is extended or adjusted under 35 U.S.C. 154(b) by 0 days.

(21) Appl. No.: 10/775,323

(22) Filed: Feb. 11, 2004

(65) Prior Publication Data

US 2004/0197743 A1 Oct. 7, 2004

Related U.S. Application Data

(60) Provisional application No. 60/446,269, filed on Feb. 11, 2003.

(51) Int. Cl.[7] .............................. G09B 1/00; B43L 1/00
(52) U.S. Cl. ........................ 434/409; 434/160; 434/168; 434/408; 434/416
(58) Field of Search .................... 434/409, 160, 434/162, 168, 408, 416; 40/449

(56) References Cited

U.S. PATENT DOCUMENTS

| | | | |
|---|---|---|---|
| 800,721 A | * 10/1905 | Coolidge | 434/160 |
| 2,682,118 A | * 6/1954 | Larsen | 434/160 |
| 4,143,472 A | 3/1979 | Murata et al. | |
| 4,344,626 A | * 8/1982 | Wadland | 273/243 |
| 4,931,019 A | * 6/1990 | Park | 434/409 |
| 4,998,883 A | * 3/1991 | Brinkley | 434/159 |
| 5,006,000 A | * 4/1991 | House | 434/161 |
| 5,413,355 A | * 5/1995 | Gonzalez | 273/429 |
| 5,820,385 A | * 10/1998 | Ohashi et al. | 434/409 |
| 6,164,976 A | 12/2000 | Wilson | |
| 6,196,848 B1 | * 3/2001 | Yamazaki | 434/409 |
| 6,416,329 B1 | * 7/2002 | Hirota et al. | 434/409 |

* cited by examiner

*Primary Examiner*—Jessica Harrison
*Assistant Examiner*—Dmitry Suhol
(74) *Attorney, Agent, or Firm*—Nixon & Vanderhye P.C.

(57) ABSTRACT

A pre-writing teaching aid assists beginning writers in creating letters and pre-writing strokes. The teaching aid includes a magnetic-responsive drawing tablet including a housing, a writing surface and structure for displaying an image responsive to magnetic contact on the writing surface. Structure for erasing the image is provided enabling the writing surface to be used over and over. The teaching aid also includes at least four magnetic stamps that are appropriately sized relative to the writing surface and are shaped as big line, little line, big curve and little curve. All of the capital letters in the English alphabet can be formed using these four simple shapes. The resulting assembly provides a fun and effective learning activity.

4 Claims, 5 Drawing Sheets

PRE-WRITING TEACHING AID AND METHOD TO ASSIST BEGINNING WRITERS IN CREATING LETTERS

CROSS-REFERENCES TO RELATED APPLICATIONS

This application claims the benefit of U.S. Provisional Patent Application Ser. No. 60/446,269, filed Feb. 11, 2003, the entire content of which is herein incorporated by reference.

STATEMENT REGARDING FEDERALLY SPONSORED RESEARCH OR DEVELOPMENT

Not applicable

BACKGROUND OF THE INVENTION

The present invention relates to a teaching apparatus and method and, more particularly, to a pre-writing teaching aid and method to assist beginning writers in creating letters and pre-writing strokes.

Helping children develop a strong foundation is an important goal for an educator. It is particularly rewarding to teach younger children since relative learning rates of young children are extraordinary, enabling teachers to watch the children blossom in the learning environment they create.

Children love to play, which is how they learn. By playing with one another, children not only learn valuable concepts, they learn how to socialize and get along with others. A play-based learning activity thus serves as an effective teaching tool. Children who feel safe and successful in their environment naturally enjoy participating and being involved with others. It is important to design an activity so that all children can participate even though they may be participating at different developmental levels. The activity should be designed to methodically and consistently teach the words children need to follow directions. When children know the meaning of words such as top/middle/bottom, big/little, line/curve, my turn/your turn, under/over, start/stop, etc., they can easily understand and follow directions. They can participate and complete tasks with confidence.

BRIEF SUMMARY OF THE INVENTION

The teaching aid of the present invention endeavors to accomplish these goals, while providing a fun and effective learning experience. The teaching aid incorporates a magnetic screen and includes four magnetic stamps shaped as big line, little line, big curve and little curve. Each capital letter in the alphabet can be represented using these four shapes. A tool resembling chalk may also be included providing the students an opportunity to trace or write the capital letters they have learned. A side eraser clears the screen so it can be used over and over. The invention also defines a method of assisting beginning writers using such a teaching aid.

In an exemplary embodiment of the invention, a pre-writing teaching aid assists beginning writers in creating letters and pre-writing strokes. The pre-writing teaching aid includes a magnetic-responsive drawing tablet including a housing, a writing surface and structure for displaying an image responsive to magnetic contact on the writing surface. A mechanism is also provided for erasing the image. The teaching aid includes at least four magnetic stamps appropriately sized relative to the writing surface and shaped as big line, little line, big curve and little curve. The teaching aid may additionally include a happy face as a visual cue in an upper left-hand corner region of the housing. A magnetic writing tool resembling a piece of chalk is attached to the housing by a cord.

In another exemplary embodiment of the invention, a method of assisting beginning writers in creating letters and pre-writing strokes utilizes the pre-writing teaching aid of the invention. The method sequentially includes (a) a teacher stamping the writing surface with one of the at least four magnetic stamps aligned with either the upper left-hand corner region of the housing or a central upper region of the housing to form a part letter image; (b) the teacher erasing the part letter image; (c) a student imitating the teacher stamping of step (a); (d) the teacher stamping the writing surface with one or more of the at least four magnetic stamps to form a complete letter image; (e) the teacher erasing the complete letter image; and (f) the student imitating the teacher stamping of step (d). Step (a) is practiced for some letters by stamping the writing surface with one of the at least four magnetic stamps aligned with the happy face visual cue. The method may further include, between steps (d) and (e), the student tracing the complete letter image with the magnetic writing tool. Additionally or alternatively, the method may include, after step (f), the student tracing the complete letter image with the magnetic writing tool.

DETAILED DESCRIPTION OF THE INVENTION

Figure 1:
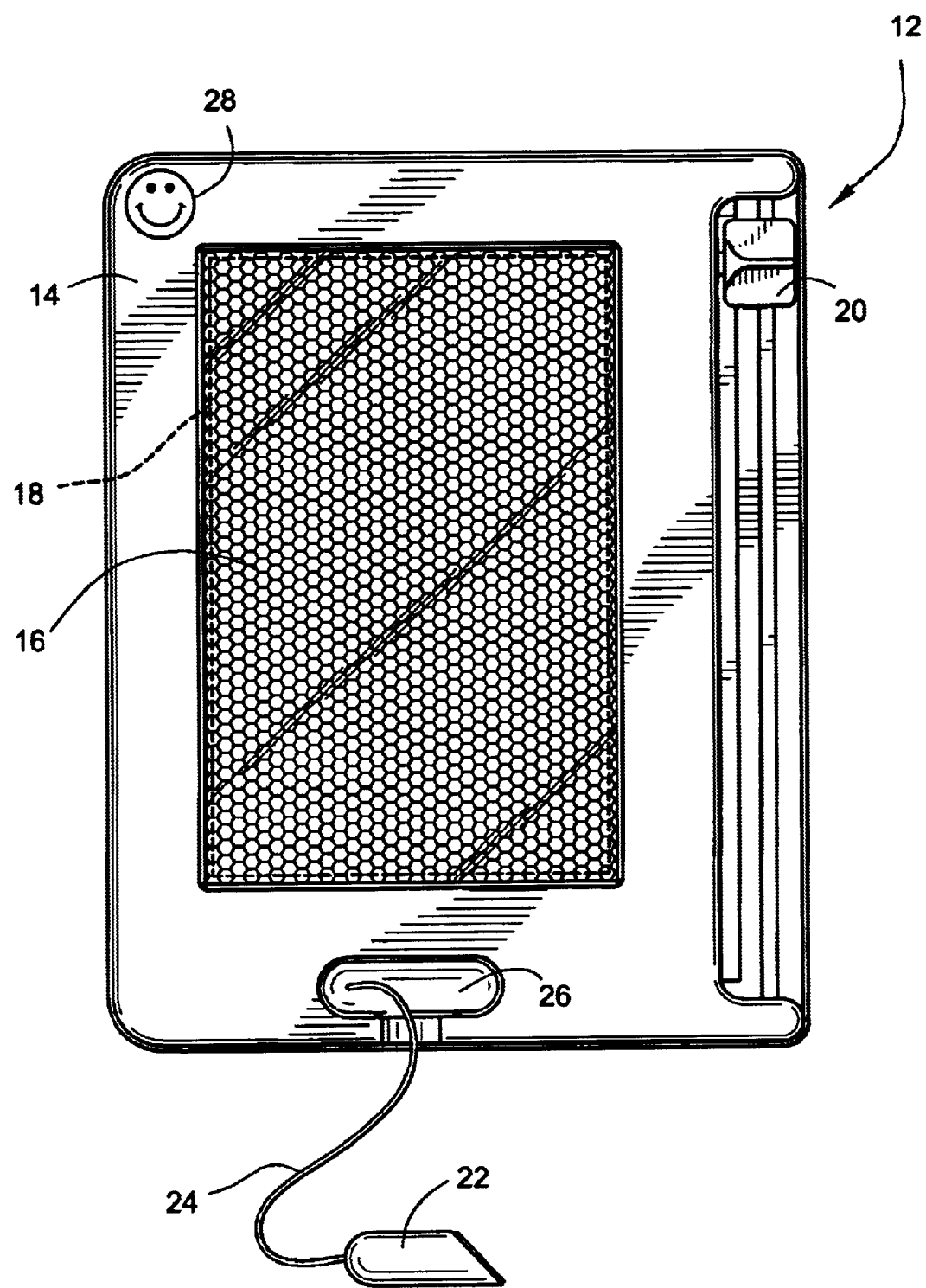
FIG. 1 is a plan view of the teaching aid according to the present invention.
Figure 2:
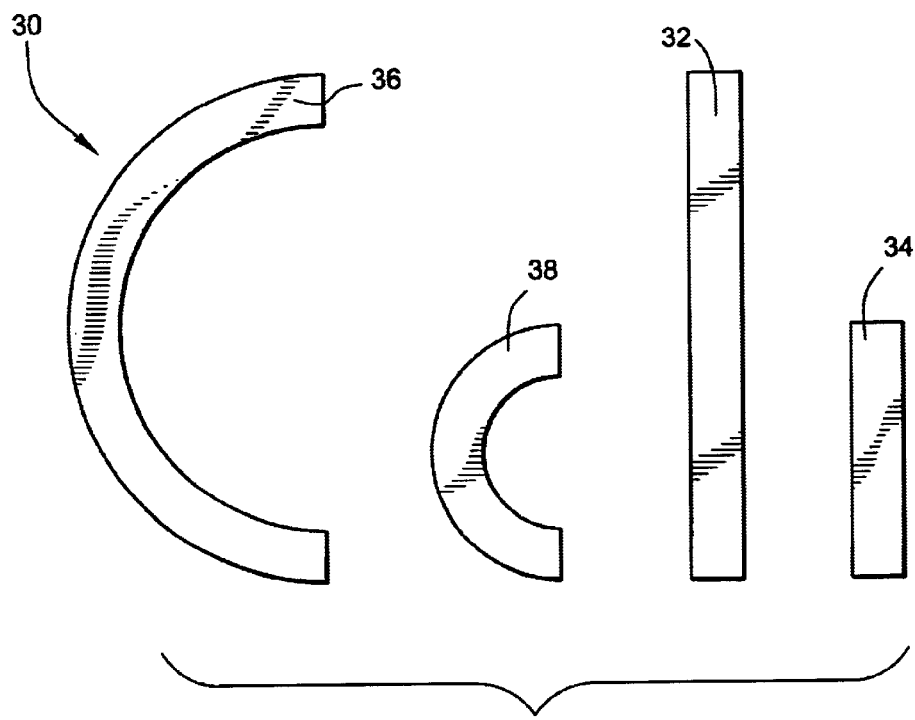
FIG. 2 shows the magnetic stamps accompanying the drawing tablet.

With reference to FIGS. 1 and 2, the pre-writing teaching aid of the present invention includes a magnetic-responsive drawing tablet 12 including a housing 14, a writing surface 16 and structure 18 generally beneath the writing surface 16 for displaying an image responsive to magnetic contact on the writing surface 16. The general structure of the magnetic-responsive drawing tablet 12 can come in many known forms. One suitable device is described in U.S. Pat. No. 4,143,472, the contents of which are hereby incorporated by reference. A discussion of related and other suitable devices is published in U.S. Pat. No. 6,164,976, the contents of which are also hereby incorporated by reference.

The teaching aid also includes a mechanism 20 for erasing an image displayed on the writing surface. The mechanism 20 of course is suited for the apparatus construction and is also generally of known structure and operation.

Optionally, the drawing tablet 12 may also be provided with a magnetic writing tool 22, preferably sized and shaped to resemble a piece of chalk. The writing tool 22 is attachable to the housing via a cord 24 and may be stored in a slot 26 in the housing 14.

The housing 14 preferably includes a visual cue 28, such as a smiley face, in an upper left-hand corner region of the housing 14, as shown in FIG. 1. The positioning of the visual cue 28 is deliberate since it that position it assists children in learning the "top to bottom, left to right" habit (i.e., correct directionality) on learning their letters. Many of the letters are formed beginning in the upper left-hand region of the page or letter area, and the positioning of the visual cue 28 reinforces this important concept in learning proper letter formation.

Figure 3:
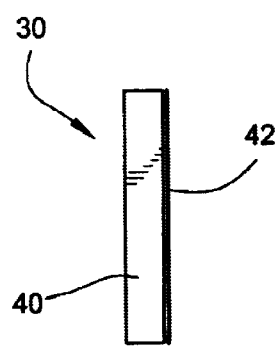
FIG. 3 is a side view of an exemplary one of the at least four stamps.

With reference to FIG. 2, the teaching aid also includes at least four magnetic stamps 30 appropriately sized relative to the writing surface 16. At a minimum, the at least four magnetic stamps 30 includes stamps shaped as big line 32, little line 34, big curve 36 and little curve 38. With these four shapes, at least every capital letter in the English alphabet can be formed on the writing tablet 12. As shown in FIG. 3, the magnetic stamps 30 include a base section 40 formed of wood, plastic or any other suitable material and a complementary shaped magnetic strip 42. In this manner, when the magnetic stamps 30 are placed magnetic strip 42 side down on the writing surface 16, an image corresponding to the magnetic stamp is displayed on the writing surface when the stamp is removed.

Figure 4:
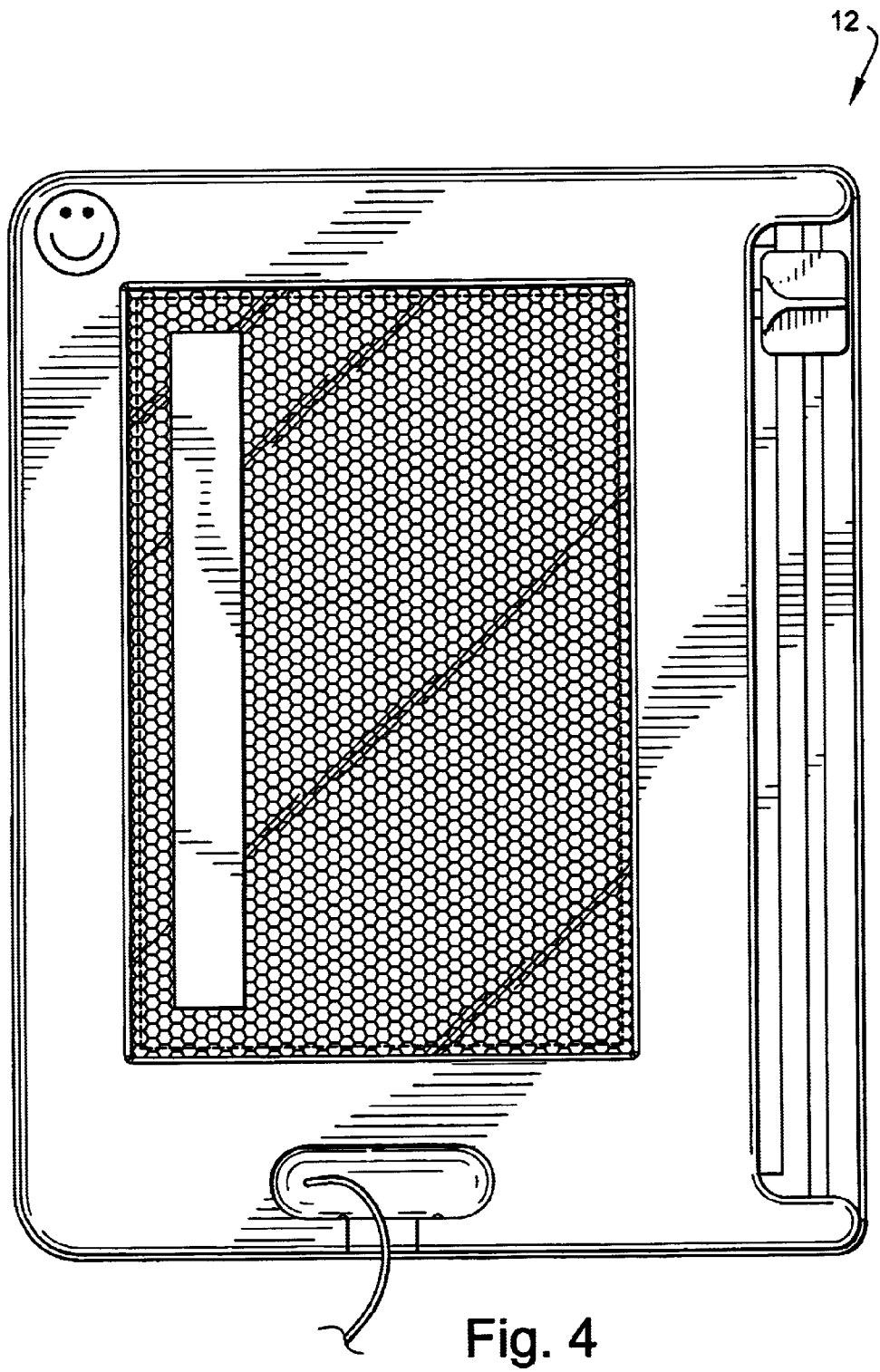
FIGS. 4–6 illustrate a method of forming a capital letter 'F' using the device and method of the present invention.
Figure 5:
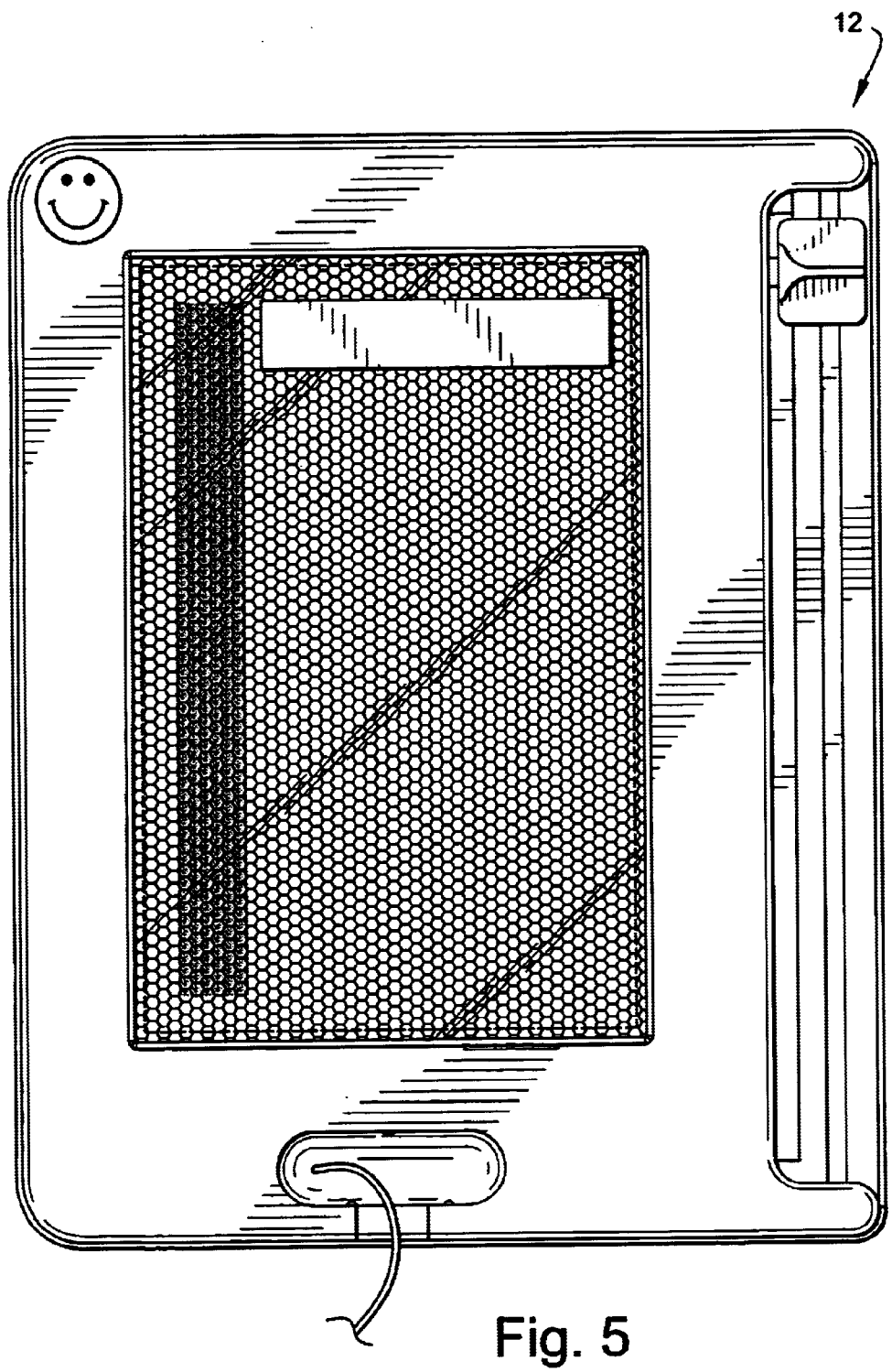
Figure 6:
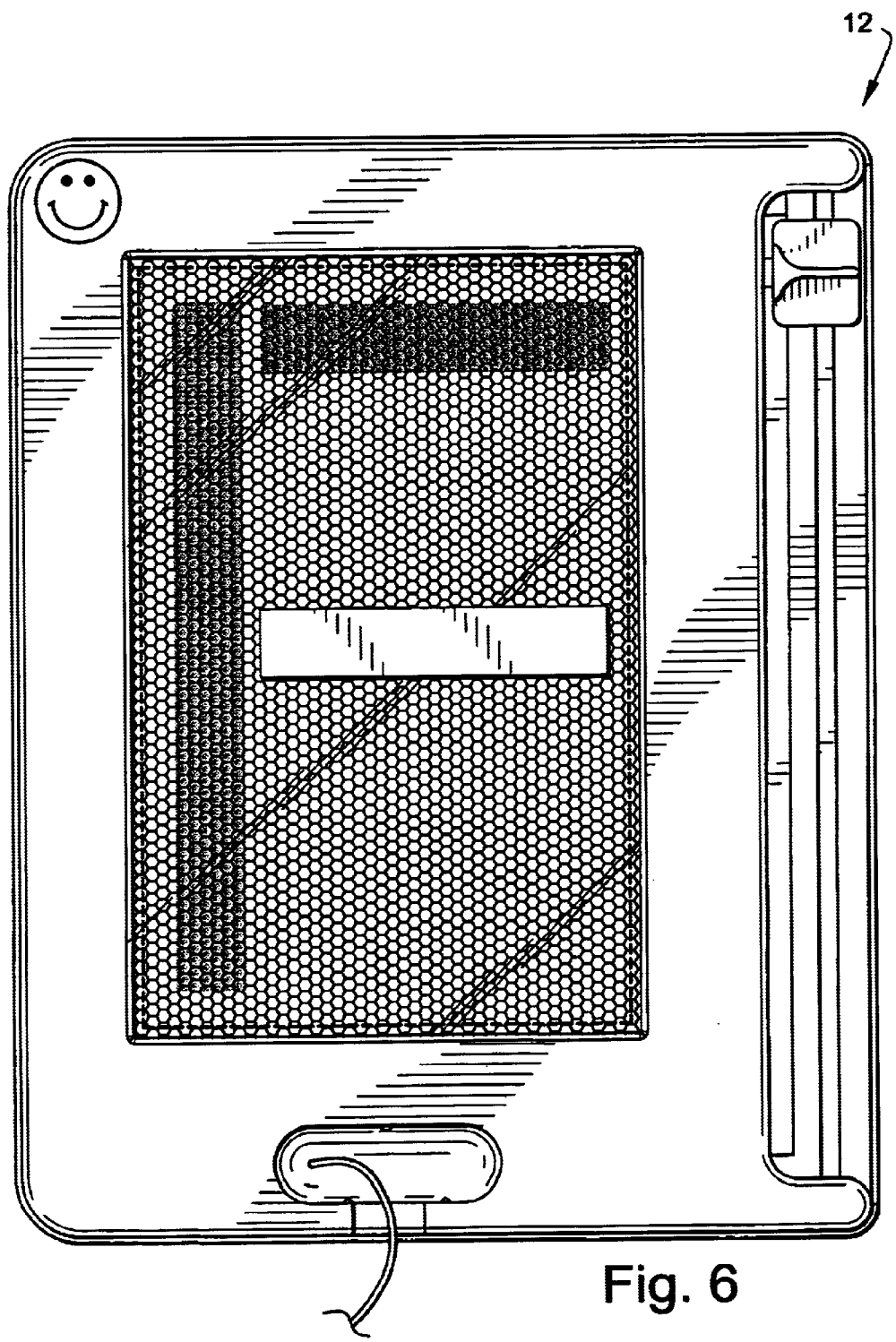

FIGS. 4–6 illustrate a method of forming a capital letter 'F' on the writing tablet 12. In one teaching mode, a teacher first stamps the writing surface 16 with a first one of the at least four magnetic stamps 30, generally aligned with either the upper left-hand corner region of the housing (e.g., via the visual cue 28) or a central upper region of the housing to form a part letter image. After a suitable time period, the teacher then erases the part letter image. The student then imitates the teacher stamping with the first of the at least four magnetic stamps. After again erasing the image, the teacher stamps the writing surface 16 with one or more of the at least four stamps 30 to form a complete letter image. After a suitable time period, the teacher then erases the complete letter image and provides an opportunity for the student to imitate the teacher and stamp the same complete letter image. The teacher may incorporate use of the magnetic tool 22 after first forming the complete letter image enabling the student to trace the complete letter image with the magnetic writing tool 22. Alternatively or additionally, the student can trace the complete letter image with the magnetic writing tool 22 after the student forms the complete letter image using the at least four magnetic stamps 30.

Of course, other sequences and teaching methods may be suitable for students of different developmental abilities. An exemplary alternative includes a mystery letter game, where a first person stamps a big line on the left edge of the writing surface 16, while the other person makes a mystery letter by stamping pieces on the right side. The first person then guesses either what the letter will be prior to completion or determines what the letter is after completion.

In a related alternative similarly using shapes as big line, little line, big curve and little curve, a teaching aid includes a tray, preferably including a visual cue in an upper left-hand corner and a section of easily manipulated dough. The children are taught how to roll the dough into shapes corresponding to big line, little line, big curve and little curve, and letters can be formed on the tray using the shaped dough. This multi-sensory activity helps children build strength in their fingers and hands while learning capital letter recognition.

With the pre-writing teaching aid of the present invention, young students are provided with an entertaining activity while assisting teachers in teaching beginning writers to create letters and pre-writing strokes. The simplified use of big line, little line, big curve, and little curve to demonstrate letter creation facilitates the letter writing process for beginning writers. Additionally, the strategic placement of a visual cue on the housing assists students in learning the "top to bottom, left to right" habit when learning their letters.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of assisting beginning writers in creating letters and pre-writing strokes using a pre-writing teaching aid including a magnetic-responsive drawing tablet having a housing, a writing surface and means for displaying an image responsive to magnetic contact on the writing surface, means for erasing the image, and at least four magnetic stamps appropriately sized relative to the writing surface and shaped as big line, little line, big curve and little curve, the method sequentially comprising:

(a) a teacher stamping the writing surface with one of the at least four magnetic stamps aligned with either the upper left-hand corner region of the housing or a central upper region of the housing to form a part letter image;

(b) the teacher erasing the part letter image;

(c) a student imitating the teacher stamping of step (a);

(d) the teacher stamping the writing surface with one or more of the at least four magnetic stamps to form a complete letter image;

(e) the teacher erasing the complete letter image; and (f) the student imitating the teacher stamping of step (d).

2. A method according to claim 1, wherein the pre-writing teaching aid further comprises a visual cue in an upper left-hand corner region of the housing, and wherein step (a) is practiced for some letters by stamping the writing surface with one of the at least four magnetic stamps aligned with the visual cue.

3. A method according to claim 1, wherein the pre-writing teaching aid comprises a magnetic writing tool attached to the housing by a cord, and wherein the method further comprises, between steps (d) and (e), the student tracing the complete letter image with the magnetic writing tool.

4. A method according to claim 1, wherein the pre-writing teaching aid comprises a magnetic writing tool attached to the housing by a cord, and wherein the method further comprises, after step (f), the student tracing the complete letter image with the magnetic writing tool.

* * * * *